Patented Apr. 27, 1926.

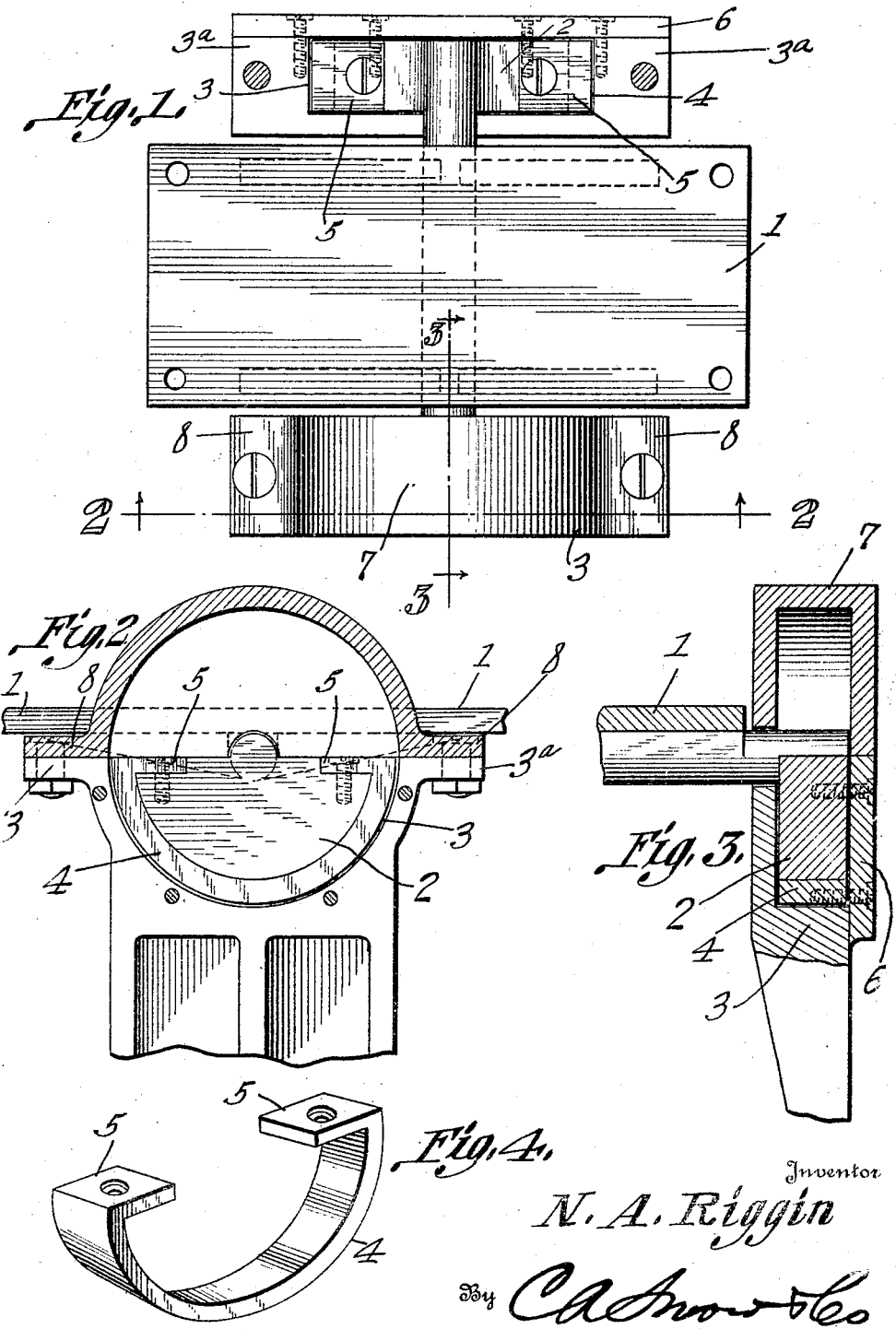

1,582,432

UNITED STATES PATENT OFFICE.

NATHANIEL A. RIGGIN, OF OILFIELDS, CALIFORNIA.

OILER FOR DERRICKS.

Application filed December 16, 1924. Serial No. 756,316.

*To all whom it may concern:*

Be it known that I, NATHANIEL A. RIGGIN, a citizen of the United States, residing at Oilfields, in the county of Fresno and State of California, have invented a new and useful Oiler for Derricks, of which the following is a specification.

This invention relates to oilers for saddles of the walking beam of an oil derrick and the object thereof is to provide a device of this character which will effectively oil the journals of the saddle and which is so constructed that access to said journals may be readily had.

Another object of the invention is to provide an oiler of this character in which the journals of the saddles are protected from dust, grit and the like and which affords ready access to the journals for repairs and the like.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a plan view of a portion of a derrick walking beam with this improved oiler used in connection therewith, the cap at one side being removed to show the interior;

Fig. 2 is a transverse section taken on the line 2—2 of Fig. 1;

Fig. 3 is a section taken on the line 3—3 of Fig. 1; and

Fig. 4 is a detail perspective view of one of the removable shoes employed in this apparatus.

In the embodiment illustrated a derrick walking beam saddle 1 is shown having semi-circular journals 2 at its opposite ends which are mounted for rocking movement in correspondingly shaped bearings 3 which also are designed to operate as oil boxes to contain oil for lubricating the journals.

The journals 2 are equipped with removable shoes 4 shaped to conform to the convex faces of the journals and provided at their ends with inwardly extending apertured fingers 5 which are counter sunk in the upper rectilinear faces of the journals and secured by fastening screws. These shoes 4 being removable may be replaced when worn or broken with very little trouble.

The combined bearings and oil reservoirs 3 are provided with removable face plates 6 secured in oil-tight relation to the reservoirs and which are designed to be removed to afford access to the journals of the beam so that if desired the shoes 4 may be removed without disturbing the beam proper, all that is necessary being to remove the dust caps 7 which are mounted over the journals as shown clearly in Figs. 2 and 3, remove plates 6 which will permit the screws which secure the shoes 4 in place to be removed and permit the shoes to be slipped longitudinally or endwise off the journals and others substituted therefor.

The dust caps 7 are constructed as shown in Figs. 2 and 3 being semi-circular or rather semi-cylindrical in cross section and provided at their side edges with longitudinally extending apertured flanges 8 which are bolted to the flanges 3ª of the journals.

In the use of this oiler the journals 2 being mounted to turn in the combined oil reservoirs and bearings 3 said reservoirs are filled with oil so that the rocking of the beam may be effected without danger of the bearings becoming dry and yet access to the journals may be readily obtained in the manner above set forth.

I claim:—

1. The combination of a supporting structure having combined oil reservoirs and bearings mounted therein, said reservoirs being semi-cylindrical in cross section, a beam having semi-circular journals to rock in said bearings, and removable shoes mounted on said journals to rock therewith and conforming to the configuration thereof.

2. The combination of a supporting structure including oil reservoirs, said reservoirs having curved inner surfaces, journals fitted within the reservoirs, said journals being curved to conform to the shapes of the reservoirs, a curved shoe having inwardly extended end portions fitted on each journal, said inwardly extended end portions having openings, securing members extending through the openings to secure the shoe to its journal, and removable dust caps for the journals.

In testimony that I claim the foregoing as my own, I have hereto affixed my signature.

NATHANIEL A. RIGGIN.